(12) United States Patent
Hielscher (10) Patent No.: US 12,169,032 B2
(45) Date of Patent: Dec. 17, 2024

(54) ACTUATOR FOR A PROCESS PLANT

(71) Applicant: SAMSON Aktiengesellschaft, Frankfurt am Main (DE)

(72) Inventor: Manuel Hielscher, Frankfurt (DE)

(73) Assignee: SAMSON AKTIENGESELLSCHAFT (DE)

( * ) Notice: Subject to any disclaimer, the term of this patent is extended or adjusted under 35 U.S.C. 154(b) by 67 days.

(21) Appl. No.: 17/918,982

(22) PCT Filed: Apr. 16, 2021

(86) PCT No.: PCT/EP2021/059863
§ 371 (c)(1),
(2) Date: Oct. 14, 2022

(87) PCT Pub. No.: WO2021/209584
PCT Pub. Date: Oct. 21, 2021

(65) Prior Publication Data
US 2023/0235834 A1    Jul. 27, 2023

(30) Foreign Application Priority Data

Apr. 16, 2020 (DE) ............. 20 2020 102 122.2

(51) Int. Cl.
*F16K 31/126* (2006.01)
*F16K 1/48* (2006.01)
(Continued)

(52) U.S. Cl.
CPC ............ *F16K 31/126* (2013.01); *F16K 1/48* (2013.01); *F16K 1/50* (2013.01); *F16K 27/08* (2013.01)

(58) Field of Classification Search
CPC . F16K 31/126; F16K 1/48; F16K 1/50; F16K 27/08
(Continued)

(56) References Cited

U.S. PATENT DOCUMENTS

| 6,364,285 | B1 * | 4/2002 | Stinnett | ............... F16K 31/46 251/293 |
| 2004/0154466 | A1 * | 8/2004 | Gethmann | .......... F16K 37/0008 92/5 R |

(Continued)

FOREIGN PATENT DOCUMENTS

| DE | 1043739 | 11/1958 |
| DE | 102006061017 | 7/2008 |

(Continued)

*Primary Examiner* — John Bastianelli
(74) *Attorney, Agent, or Firm* — Frijouf, Rust & Pyle, P.A.

(57) ABSTRACT

The invention relates to an actuator (10) for a process plant, comprising an actuating valve (14) and an actuating drive (12) which has an actuating drive housing (20) and a drive rod (18) mounted in the actuating drive housing (20), wherein the actuating drive housing (20) is connected to a valve housing (22) of the actuating valve (14) via a connecting housing. The invention is characterized in that a second rod coupling (46) and an adjusting rod (42) are provided, the adjusting rod (42) being provided in the region between the drive rod (18) and the valve rod (38), one rod coupling (44, 46) coupling the adjusting rod (42) to the drive rod (18), and one rod coupling (44, 46) coupling the adjusting rod (42) to the valve rod (18).

18 Claims, 4 Drawing Sheets

(51) Int. Cl.
*F16K 1/50* (2006.01)
*F16K 27/08* (2006.01)

(58) Field of Classification Search
USPC .......................................... 251/214, 291–293
See application file for complete search history.

(56) References Cited

U.S. PATENT DOCUMENTS

| | | | | |
|---|---|---|---|---|
| 2015/0233489 A1* | 8/2015 | Gossett | ................ | F16K 31/126 |
| | | | | 251/83 |
| 2015/0240965 A1* | 8/2015 | Arnold | .................... | F16K 27/08 |
| | | | | 251/58 |
| 2019/0072205 A1 | 3/2019 | Heuheuser | | |

FOREIGN PATENT DOCUMENTS

| | | |
|---|---|---|
| DE | 202010017561 | 2/2012 |
| DE | 202017105252 | 10/2017 |

* cited by examiner

ACTUATOR FOR A PROCESS PLANT

This patent application is the national phase entry of PCT/EP2021/059863, international application filing date Apr. 16, 2021, which claims the benefit and priority of and to German patent application No. 20 2020 102 122.2, filed Apr. 16, 2020.

PCT/EP2021/059863, international application filing date Apr. 16, 2021 and German patent application No. 20 2020 102 122.2, filed Apr. 16, 2020 are incorporated herein by reference hereto in their entireties.

BACKGROUND OF THE INVENTION

The invention relates to an actuator for a process plant and to a system of an actuator.

In process plants, actuators are used to feed process fluid flows, for example, to industrial processes via conduits. With regard to the individual process and operation, the process fluid flows need to be adjusted according to specific control variables, including the flow rate. Moreover, these process fluid flows may be fed continuously or discontinuously to an industrial process in the process plant. The actuators are used to control and regulate these process fluid flows.

Actuators of this type, which have been known far some time, have an actuating drive and an actuating valve. The actuating drive in turn has an actuating drive housing and a drive rod mounted in the actuating drive housing. The actuating drive housing is connected to the actuating valve, more precisely to a valve housing of the actuating valve, via a connecting housing, for example a yoke. A valve seat is provided in the valve housing, arid a valve member, usually a valve cone, is mounted therein that interacts with the valve seat. The valve cone is connected to a valve rod, which in turn is coupled to the drive rod of the actuating drive and is moved via it. The valve cone may serve as a shut-off and/or throttling member for the process fluid. For example, by raising or lowering the valve cone, the opening cross-section within the valve seat can be set in a predetermined manner, or the actuating valve can be closed.

The valve housing has an inlet opening through which the process fluid enters the actuating valve, and an outlet opening through which the process fluid exits the actuating valve. The valve seat of the actuating valve is located between the inlet opening and the outlet opening. A flange each is provided in the inlet opening and the outlet opening so as to connect the actuating valve to a pipeline and to integrate it into the process plant.

The valve rod and the drive rod are connected to one another via a rod coupling. The rod coupling may be provided with an rotation lock which prevents the drive rod, or the valve rod with the valve member, from rotating during operation. Particularly in the case of valve members having special control contour profiles, which only achieve their control characteristics when the valve member is precisely aligned with the valve seat, it, is necessary to align the valve member in a predetermined manner and prevent it from rotating during operation. The aforementioned rotation lock is used for this purpose.

For configuring new actuators, a large number of actuating drives and actuating valves of different sizes can be combined with each other. For this purpose, the connecting housing, i.e. the length of the yoke, for example, as well as the length of the valve rod and of the drive rod in connection with the desired stroke of the actuating drive and of the valve member must be precisely matched.

DE 20 2010 017 561 U1 describes an actuator for a process plant which has a pneumatically operated actuating drive with a drive rod. In addition, the control unit has an actuating valve with a valve rod actuated by the actuating drive, which valve rod is arranged in particular as an axial extension of the drive rod. A valve cone is attached to the valve rod. A rod coupling connects the drive rod and the valve rod for power transmission, in particular of axial translational actuating movements. In addition, the rod coupling allows the axial distance between the facing ends of the valve rod andl the drive rod to be adjusted in order to set the overall axial length of the drive rod and the valve rod. For this purpose, the rod coupling comprises two half shells that rest against one another and that have two positioning devices for non-positive coupling the half shells at the respective ends of the drive rodl and the valve rod. At least one of these positioning devices is designed to change the axial fastening position of the half shell relative to the drive rod and/or valve rod.

DE 20 2017 105 252 U1 describes a similar actuator for a process plant with a pneumatically operated actuating drive, a yoke and an actuating valve. Here, too, the rod coupling has two half shells attached to one another. On the one hand, the rod coupling is secured against rotation relative to the yoke and, on the other hand, it is firmly connected to the valve rod so that rotation of the valve member relative to the yoke is prevented in all cases.

However, what is disadvantageous about the known actuators is that they only provide for limited possibilities for adjusting the distance between the drive rod and the valve rod with the help of the rod coupling. For example, the threads provided in the rod coupling are limited in length. The valve rod and the drive rod should be screwed into or arranged in the rod coupling over at least 1 to 1.5 times the respective rod diameter in order to create a surface for the connection that is sufficient for the loads. If the threads provided in the rod coupling are enlarged, the rod coupling will invariably also have to be enlarged. However, this would then require the connecting housing to be adapted as well so as to prevent the rod coupling from hitting the valve housing or the actuating drive housing in all the adjusted positions. It is not possible either to extend the thread of the drive rod into the actuating drive housing, nor is it possible to extend the thread of the valve rod into the valve housing because then there would no longer be any sealing, among other things.

SUMMARY OF THE INVENTION

It is the object of the invention to improve on an actuator in such a way that, while avoiding the disadvantages mentioned, the possibility is created of easily combining different sizes of actuating drives with different sizes of actuating valves. In particular, such an improved design should allow the distance between the valve rod and the drive rod, which is different in each case due to the different sizes, to be easily compensated and the stroke to be easily adjusted without having to exchange the connecting housing.

This object is accomplished by the characterizing features of claim 1 in conjunction with the features of its preamble.

The subclaims constitute advantageous further embodiments of the invention.

The invention is based on the insight that by using an additional rod, the possibilities of compensating for the different distances, but also the adjustment possibilities, can be considerably expanded in a simple manner.

According to the invention, a second rod coupling and an adjusting rod are provided, the adjusting rod being provided in the area between the drive rod and the valve rod. Here, one rod coupling couples the adjusting rod to the drive rod, and another rod coupling couples the adjusting rod to the valve rod. Depending on the length of the adjusting rod, different distances can be easily compensated in a simple manner, namely by selecting the appropriate length of the adjusting rod.

The econd rod coupling can connect the drive rod and the djusting rod to one another.

In particular, to enable safe power transmission on the one hand and easy assembly on the other hand, the second rod coupling positively connects the drive rod to the adjusting rod in a direction of the axis of the drive rod.

According to one embodiment of the invention, the first rod coupling comprises the rotation lock, which is connected to the connecting housing and allows a drive movement.

The first rod coupling may connect the adjusting rod and the valve rod to one another.

Depending on the requirements, it may be advantageous for the first rod coupling to connect the valve rod to the adjusting rod in a non-positive or positive-locking manner in a direction of the axis of the valve rod.

Preferably, the length of the first rod coupling is made up of a minimum contact surface, as necessary for the non-positive connection, for the valve rod in the first rod coupling, the minimum contact surface for the adjusting rod in the first rod coupling, and the maximum compensation range for several different actuating valves and/or the maximum adjustment range for adjusting the stroke of the valve member of the actuating valve.

Preferably, the valve rod has an external thread at its free end which is associated with the first rod coupling, the first rod coupling having an internal thread assigned to the external thread of the valve rod. so that fine adjustment of the distance between the valve rod and the adjusting rod can be made in the first rod coupling. This provides a high degree of flexibility for compensating the distance between the valve rod and the drive rod with the aid of the adjusting rod, without always having to use a different length of adjusting rod when the combination of actuating valve and actuating drive changes.

According to another embodiment of the invention, the adjusting rod has an external thread at its free end, which is associated with the first rod coupling, the first rod coupling having an internal thread associated with the external thread of the adjusting rod. This allows a fine adjustment of the distance between the adjusting rod and the valve rod to be made in the first rod coupling.

At its free end, which is associated with the second rod coupling, the adjusting rod may have an outer contour which, in cooperation with the inner contour of the second rod coupling adapted thereto, produces a form fit in the axial direction of the adjusting rod.

In order to be able to rotate the adjusting rod by means of a wrenching tool, the adjusting rod has a wrenching surface between the external thread and the external contour for engagement by a wrenching tool.

Preferably, the first rod coupling comprises two half shells which are screwed together and enclose the free ends of the adjusting rod and of the valve rod. This allows easy assembly and connection of the first rod coupling to the adjusting rod and the valve rod.

The drive rod, the adjusting rod and the valve rod may be arranged concentrically to each other and to a drive axis, with the half shells resting against each other in a plane that runs through the drive axis.

According to an embodiment of the invention, the rotation lock engages a rail on the connecting housing, which rail extends parallel to the drive rod. The rotation lock is thus guided along the rail during the stroke movement of the actuator and acts as an abutment to prevent rotation. To ensure that the stroke movement is not impaired by high sliding friction, the rotation lock has detachably arranged sliding shoes, in particular in the form of sliding bolts, via which the rotation lock rests against, is supported on and slides along the connecting housing during a stroke movement of the drive rod. The frictional resistance can be optimized by selecting the appropriate sliding shoes. The sliding shoes can be made of plastic.

According to a further aspect of the invention, the object is accomplished by a system of an actuator of the type described above. This system comprises a plurality of differently designed actuating drives and/or actuating valves as well as a plurality of adjusting rods, each having a different length, and enables a method for adjusting a stroke of a valve member of an actuating valve, in that a first coarse adjustment/a first coarse compensation of the distance to the valve rod is effected by selecting the acluating drive and/or the actuating valve as well as the suitable length of the adjusting rod.

In addition, a second fine adjustment can be made in the system by turning the adjusting rod with its external thread relative to the internal thread of the first rod coupling.

In addition or as an alternative, the second fine adjustment can be made by rotating the valve rod with its external thread relative to the internal thread of the first rod coupling.

According to a further embodiment of the system, the second fine adjustment can be made by arranging the valve rod and the adjusting rod relative to one another in the first rod coupling and subsequent clamping the rod coupling.

With the help of the system, it is thus possible to combine different sizes of actuators and actuating valves, and to roughly adjust the distances between the valve rod and the drive rod in a first step via an adjusting rod and to finely adjust them via the threads of the valve rod and/or the drive rod and the first rod coupling.

The invention thus provides for separating the function of coupling the rods and of a first compensation of the distance into different components. The adjusting rod can be provided in different lengths, so that a very large amount of axial adjustment travel becomes possible between the drive rod and the valve rod. The axial fine adjustment is achieved by screwing or pushing the rods into the first rod coupling to the required extent. After adjusting the rods relative to each other, the halves of the first rod coupling are screwed together and thus clamped Especially in the case of non-symmetrical flow-optimized valve members, which must be adjusted towards the inlets and outlets of the actuating valve housing, any rotation relative to one another during operation must be avoided.

The connecting housing is designed in particular as a yoke that is arranged between the valve housing, for example a cover, and the actuating drive.

Additional advantages, features and possible applications of the present invention will be apparent from the description which follows in which reference is made to the embodiments illustrated in the drawings.

Throughout the description, the claims and the drawings, those terms and associated reference signs are used as are listed in the list of reference signs below.

DESCRIPTION OF THE INVENTION

FIGS. 1 to 4 are views of an embodiment of an actuator 10 according to the invention. The actuator 10 essentially comprises a pneumatic actuating drive 12, an actuating valve 14, and a connecting housing in the form of a yoke 16.

Figure 1:
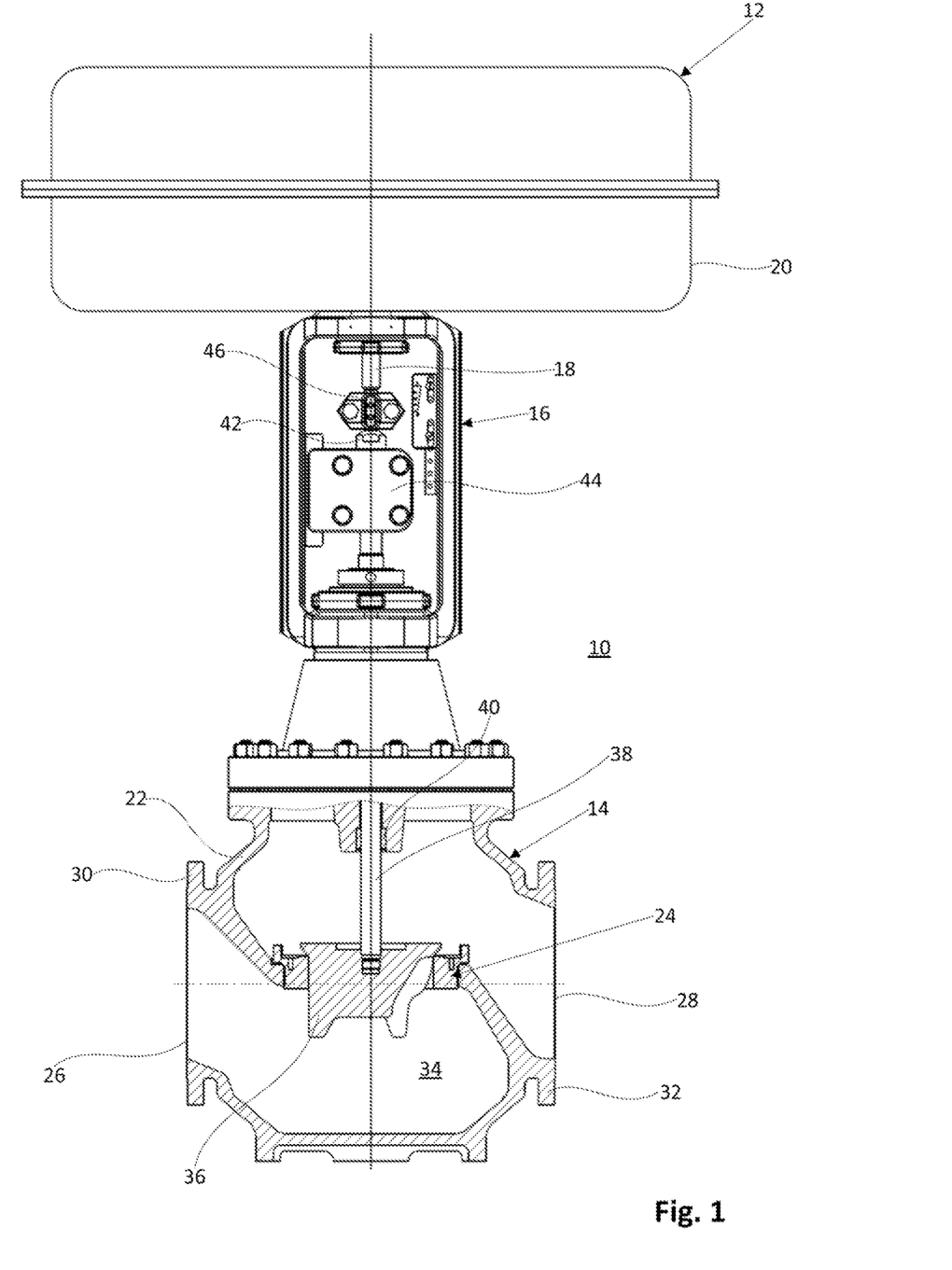
FIG. 1 is a lateral view of the actuator according to the invention with an actuating drive, a connecting housing and an actuating valve, the actuating housing being shown in longitudinal section except for its upper portion.

The actuating drive 12 includes an actuating drive housing 20, the interior of which is separated into a working chamber and a reset chamber by a support plate-diaphragm arrangement. The actuating drive housing 20 is provided with a pneumatic input port, not shown here, through which a loading pressure can be applied to the working chamber. The working chamber is fluid-tightly separated from the reset chamber via the support plate-diaphragm arrangement. Return springs are arranged in the reset chamber. The loading pressure moves the support plate-diaphragm arrangement in one direction against the force of the return springs and, when the loading pressure decreases, it is moved in the other direction by the force of the return springs. The actuating drive 12 is a conventional actuating drive. Therefore, the individual parts of the actuating drive 12 mentioned above are not shown in detail.

A drive rod 18 is attached to the support plate-diaphragm arrangement. The support plate-diaphragm arrangement is provided with a stop that limits upward axial movement of the drive rod 18. The drive rod 18 extends through the reset chamber, through the lower wall of the actuating drive housing 20, and with its valve end extending vertically into the yoke 16.

The actuating valve 14 includes an actuating valve housing 22 having a valve seat 24 disposed within the actuating valve housing 22. The actuating valve housing 22 is provided with an inlet port 26 through which process fluid enters the actuating valve housing 22, and with an outlet port 28 through which process fluid exits the actuating valve housing 22. The inlet opening 26 and the outlet opening 28 are each surrounded by a flange 30, 32 in order to connect the actuating valve housing 22 in a known manner to an inlet pipe (not shown here) and an outlet pipe (not shown here), and thus to integrate it into a pipe system. A fluid passage 34 for the process fluid extends in the actuating valve 14 from the inlet port 26 through the valve seat 24 to the outlet port 28.

Cooperating with the valve seat 24 is a valve member 36 connected to a valve rod 38. The valve rod 38 is aligned vertically, in axial alignment with the drive rod 18. At the end of the valve rod 22 facing away from the drive rod 18, the valve rod 22 is connected to the valve member 36. The valve seat 24 defines a valve opening. Via the valve member 36, the valve seat 24 is closed or more or less released as required. The position of the valve member 36 relative to the valve seat 24 adjusts, for example, a flow rate of the process fluid through the actuating valve 14, or, when the valve member 36 rests on the valve seat 24, altogether prevents the flow of the process fluid through the actuating valve 14.

A guide sleeve 40 is provided in the actuating valve body 22 for guiding the valve rod 38, as well as a seal packing (not shown).

Figure 2:
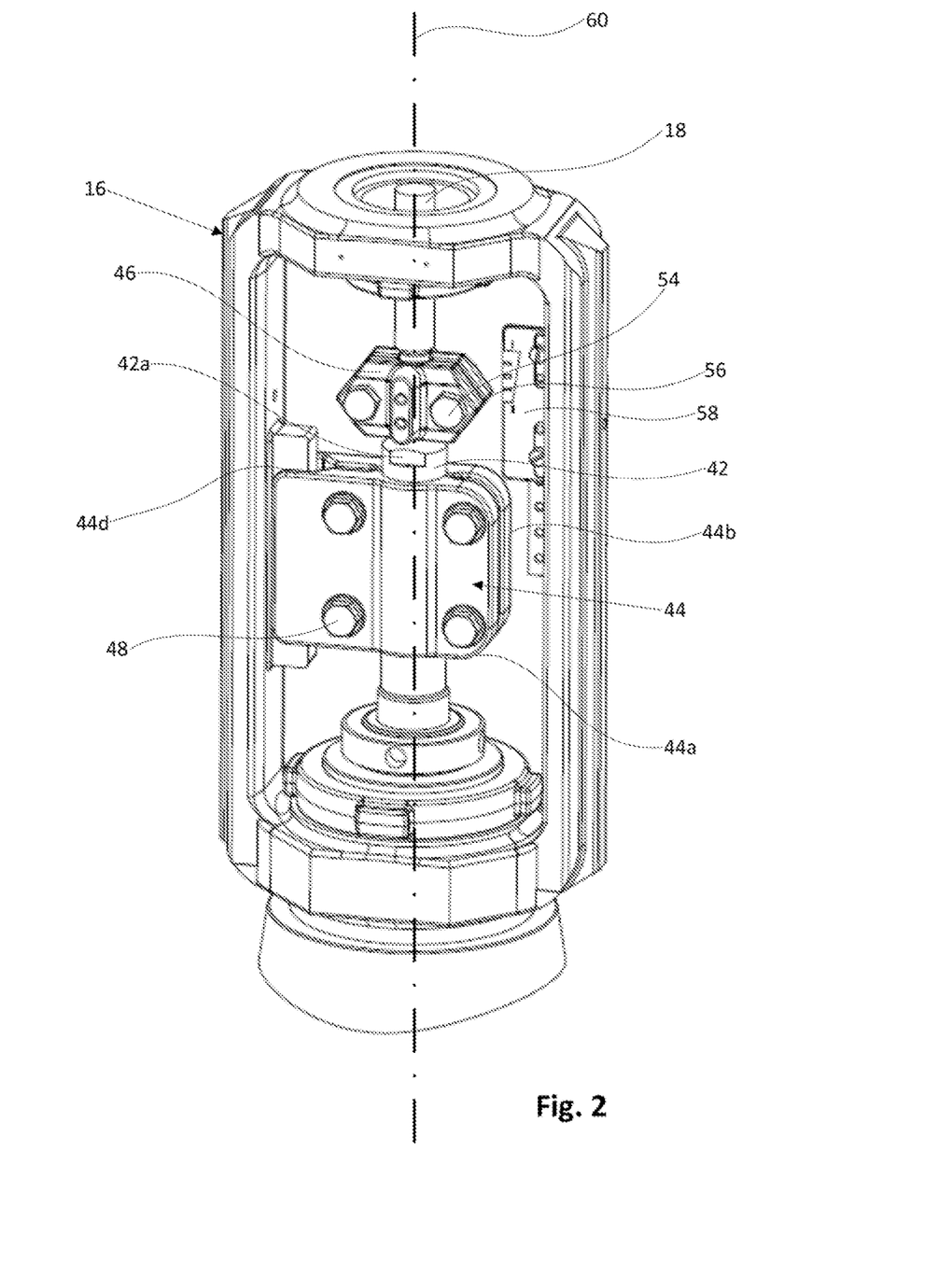
FIG. 2 is a front perspective view of the ready-to-use connecting housing including a drive rod, an adjusting rod and a valve rod as well as first and second rod couplings.

An adjusting rod 42 is arranged between the valve rod 38 and the drive rod 18 so as to be coaxial with the valve rod 38 and the drive rod 18. The valve-side end of the adjusting rod 42 and the drive-side end of the valve rod 38 are connected to one another via a first rod coupling 44.

The adjusting rod 42 extends beyond the first rod coupling 44 in the direction of the drive rod 18. The drive-side end of the adjusting rod 42 and the valve-side end of the drive rod 18 are connected to one another via a second rod coupling 46.

Figure 3:
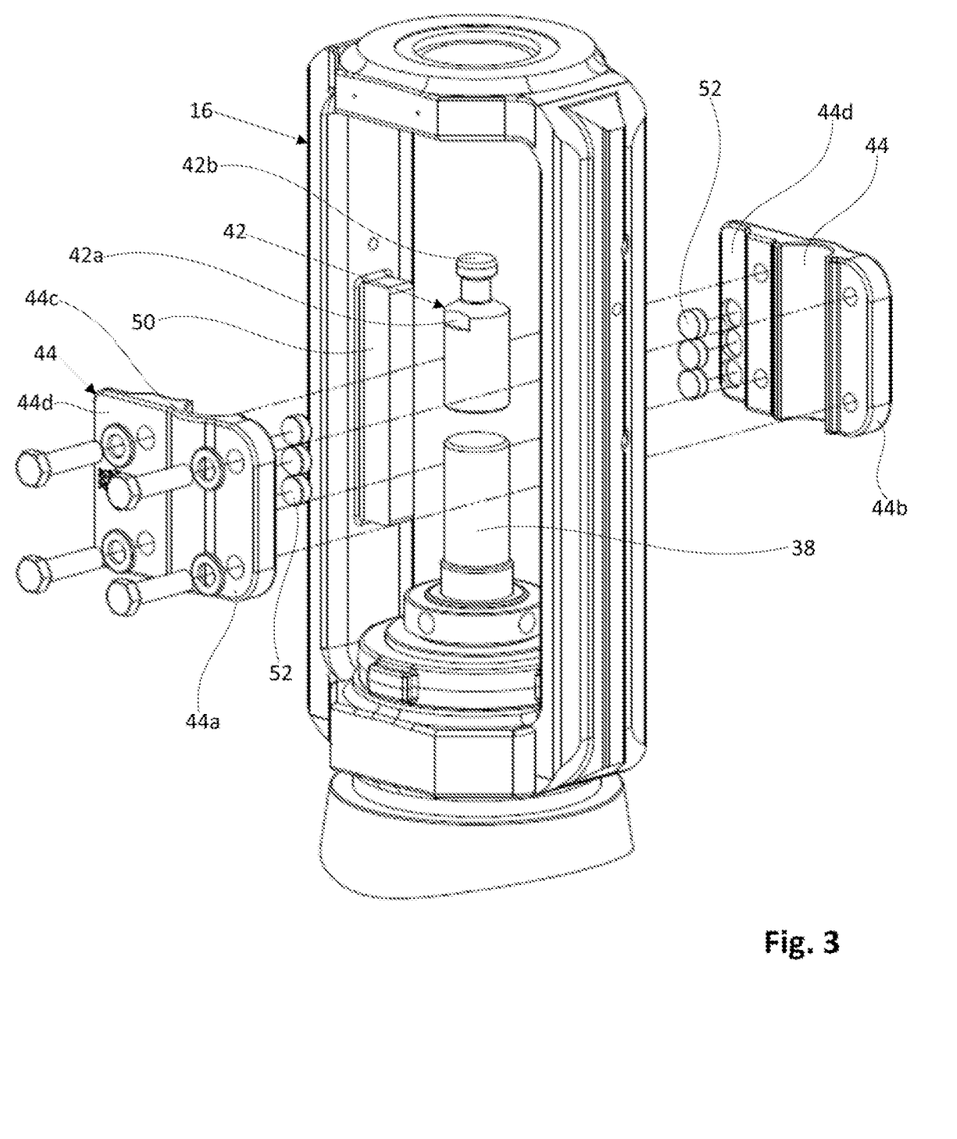
FIG. 3 is a front perspective view, taken from the side, of the connecting housing without the drive rod, without the second rod coupling, with the adjusting rod and the valve rod, with the first rod coupling shown in exploded view.

In the region associated with the first rod coupling 44, the valve rod 38 and the adjusting rod 42 have the same diameter. The first rod coupling 44 comprises two half shells 44a and 44b, each having a cylindrical inner contour 44c that is adapted to the cylindrical outer contour of the valve rod 38 and the adjusting rod 42 in the associated region.

The two half shells 44a and 44b are connected to one another by screws 48 in such a way that the adjusting rod 42 and the valve rod 38 are non-positively fixed relative to one another in the axial direction at a predetermined distance from each other.

The first rod coupling 44 has a length consisting of a minimum contact surface of the valve rod 38 with the inner contour 44c necessary for the non-positive connection, a minimum length necessary for a threaded connection between the first rod coupling 44 and the adjusting rod 42, and the maximum compensation range for several different actuating valves 14 and the maximum adjustment range for adjusting the stroke of the valve member 36 of the actuating valve 14.

On its one side, the yoke 16 is provided with a guide rail 50 aligned parallel to the longitudinal extent of the yoke 16 and thus to the direction of movement of the actuating drive 12. The half shell 44a and the half shell 44b engage the guide rails 50 at their front and rear sides. For this purpose, the half shells 44a, 44b are provided with a guide leg 44d. Each guide leg 44d extends parallel to the guide rail 50 and is provided with sliding bolts 52 on the inside.

The sliding bolts 52 and the guide rail 50 are matched to one another in terms of material. There is permanent contact between them. Selecting matching materials enables a sliding action with as little frictional resistance as possible during operation of the actuator 10. For this purpose, the guide rail 50 is made of cast steel and the sliding bolts 52 are made of plastic.

Through its guide leg 44d with the sliding bolts 52, in cooperation with the guide rail 50, the first rod coupling 44 thus serves as a rotation lock for the valve rod 38 which is firmly connected to the first rod coupling 44.

Figure 4:
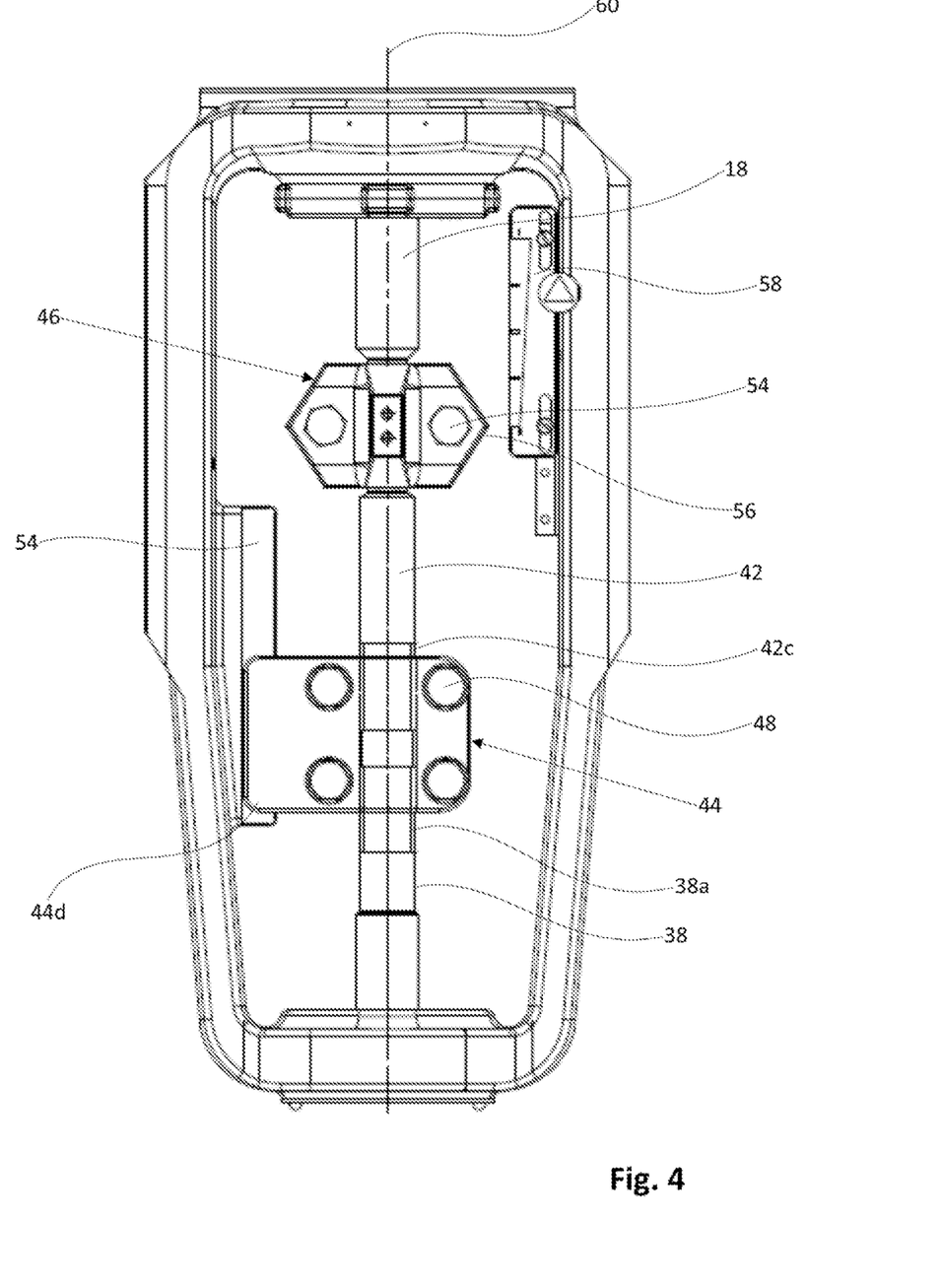
FIG. 4 is a front view of the drive housing ready for operation.

The adjusting rod 42 is provided with an external thread 42c in the area associated with the first rod coupling 44, and the first rod coupling 44 is provided with an internal thread in the internal contour 44c in the area associated with the adjusting rod 42. This thus allows the distance between the valve rod 38 and the adjusting rod 42, and hence the stroke, to be further adjusted in the assembled state. For this purpose, the adjusting rod 42 has wrenching flats 42a in the region of the adjusting rod 42 that protrudes from the first rod coupling 44. A wrenching tool can engage the wrenching flats 42a and turn the adjusting rod 42 relative to the first rod coupling 44 via the thread, thus changing the distance to the valve rod 38. In addition, the valve rod 38 may also be provided with an external thread 38a, and with an internal thread in the region of the first rod coupling 44 associated with the valve rod 38, as is illustrated in FIG. 4.

The region of the adjusting rod 42 associated with the second rod coupling 46 is of a stepped design, which is terminated by a retaining head 42b on the drive rod side. The end of the drive rod 18 on the valve rod side is of a corresponding mirror-inverted design. The inner contour of the second rod coupling 46 is designed to match this so that a backlash-free form fit is achieved.

The second rod coupling 46 also consists of two half shells that are connected to each other by screws 54. The second rod coupling 46 extends laterally on the outside to a point which serves as a pointer 56. A marking 58 is provided laterally on the inside of the yoke 16. The position of the pointer 56 relative to the marking 58 can be used to read the position of the valve member 36 relative to the valve seat 24, and thus the stroke. The second rod coupling 46 may also include mechanical stroke sensing means adapted to be coupled to a positioner or to a stroke indicator in order to output an actuating signal pro-portional to the stroke value.

The first rod coupling 44 and the second rod coupling 46 each comprise two half shells. The drive rod 18, the adjusting rod 42 and the valve rod 38 are arranged concentrically to one another and to a drive axis 60. The half shells each rest against each other in a plane that passes through the drive axis 60, A set of adjusting rods 42 of different lengths is available for adjusting the stroke of the actuator 10 for an actuating valve 14 selected from several actuating valves of different sizes. Selecting a suitable length of an adjusting rod 42 allows an initial rough adjustment of the compensation of the distance between the valve rod 38 and the drive rod 18 as well as an adjustment of the desired stroke. A further possibility for adjustment is provided by the arrangement of the valve rod 38 relative to the first rod coupling 44 over the clamping range as the range in which a clamping/non-positive connection of the first rod coupling 44 and the valve rod 38 is possible.

Fine adjustment can then be made by rotating the adjusting rod 42 relative to the first rod coupling 44 using a tool wrench and the thread 42c.

The invention is thus characterized by providing various possibilities of an adjustment or compensation of the different spacing between a valve rod 38 and the drive rod 18 When different actuating valves 14 are connected for an actuating drive 12 with a predetermined yoke 16.

LIST OF REFERENCE SIGNS 10 actuator
12 actuating drive
14 actuating valve
16 yoke
18 drive rod
20 actuating drive housing
22 actuating valve body
24 valve seat
26 inlet port of actuating valve housing 20
28 outlet port of actuating valve housing 20
30 flange at inlet port 26
32 flange at outlet port 28
34 fluid passage of actuating valve housing 20
36 valve member
38 valve rod
38a external thread of valve rod 38
40 guide sleeve
42 adjusting rod
42a wrenching flat for adjusting rod 42
42b retaining head of adjusting rod 42
42c external thread of adjusting rod 42
44 first rod coupling
44a half shell of first rod coupling 44-front
44b half shell of first rod coupling 44-rear
44c inner contour of first rod coupling 44
44d guide leg of first rod coupling 44
46 second rod coupling
48 screws of first rod coupling 44
50 guide rail
52 sliding bolt of first rod coupling 44
54 screws of second rod coupling 46
56 tip, pointer of second rod coupling 46

The invention claimed is:

1. Actuator (10) for a process plant, comprising an actuating valve (14) and an actuating drive (12) which has an actuating drive housing (20) and a drive rod (18) mounted in the actuating drive housing (20), wherein the actuating drive housing (20) is connected to a valve housing (22) of the actuating valve (14) via a connecting housing (16), wherein the actuating valve (14) comprising a valve seat (24) and a valve member (36) which interacts with the valve seat (24) and is connected to a valve rod (38) which protrudes into the connecting housing (16), wherein a first rod coupling (44) is provided in order to transfer the driving force between the drive rod (18) and the valve rod (38), and wherein a modular unit composed of the drive rod (18), the valve rod (38) and the first rod coupling (44) is mounted movably relative to the connecting housing (16) via a rotation lock (44d, 50, 52), characterized in that a second rod coupling (46) and an adjusting rod (42) are provided, the adjusting rod (42) being provided in the region between the drive rod (18) and the valve rod (38), one rod coupling (44, 46) coupling the adjusting rod (42) to the drive rod (18) and one rod coupling (44, 46) coupling the adjusting rod (42) to the valve rod (38); and the adjusting rod (42) has an external thread at a free end of the adjusting rod (42) that is associated with the first rod coupling (44), the first rod coupling (44) having an internal thread associated with the external thread of the adjusting rod (42), so that fine adjustment of the distance of the adjusting rod (42) with respect to the valve rod (38) can be made in the first rod coupling (44).

2. Actuator according to claim 1, characterized in that the second rod coupling (46) interconnects the drive rod (18) and the adjusting rod (42).

3. Actuator according to claim 1, characterized in that the second rod coupling (46) positively connects the drive rod (18) to the adjusting rod (42) in a direction of the axis (60) of the drive rod (18).

4. Actuator according to claim 1, characterized in that the first rod coupling (44) comprises the rotation lock (44d, 50, 52), which is connected to the connecting housing (16) and allows a drive movement.

5. Actuator according to claim 1, characterized in that the first rod coupling (44) interconnects the adjusting rod (42) and the valve rod (38).

6. Actuator according to claim 5, characterized in that the first rod coupling (44) connects the valve rod (38) to the adjusting rod (42) in a non-positive or positive manner in a direction of the axis (60) of the valve rod (38).

7. Actuator according to claim 1, characterized in that the first rod coupling (44) has a length which comprises a minimum contact area for the valve rod (38) with the first rod coupling (44), which is necessary for the non-positive connection, the minimum contact area for the adjusting rod (42) with the first rod coupling (44), and the maximum compensation range for a plurality of different actuating valves (14) and/or the maximum adjustment range for adjusting the stroke of the valve member (36) of the actuating valve (14).

8. Actuator according to claim 1, characterized in that the adjusting rod (42) has at a free end of the adjusting rod (42) that is associated with the second rod coupling (46), an outer contour which, interacting with the inner contour of the second rod coupling (46) adapted thereto, results in a form fit in the axial direction of the adjusting rod (42).

9. Actuator according to claim 1, characterized in that the adjusting rod (42) has a wrenching flat (42a) between the external thread and the external contour for engagement by a wrenching tool so as to enable rotation of the adjusting rod (42) by means of the wrenching tool engaging the wrenching flat (42a).

10. Actuator according to claim 1, characterized in that the first rod coupling (44) comprises two half shells (44a, 44b) screwed together and embracing the free ends of the adjusting rod (42) and the valve rod (38).

11. Actuator according to claim 10, characterized in that the drive rod (18), the adjusting rod (42) and the valve rod (38) are arranged concentrically to each other and to a drive axis (60), wherein the half shells (44a, 44b) rest against each other in a plane that extends through the drive axis (60).

12. Actuator according to claim 1, characterized in that the rotation lock engages in a rail (50) on the connecting housing (16) which extends parallel to the drive rod (18).

13. System of an actuator according to claim 1, having a plurality of actuating drives (12) and/or actuating valves (14) and having a plurality of adjusting rods (42), each being of a different length for adjusting a stroke of a valve member (36) of a actuating valve (14), in that by selecting the actuating drive (12) and/or the actuating valve (14) and the appropriate length of the adjusting rod (42).

14. System according to claim 13, characterized in that a second fine adjustment is made by turning the adjusting rod (42) with the external thread relative to the internal thread of the first rod coupling (44).

15. System according to claim 13, characterized in that a second fine adjustment is made by turning the valve rod (38) with the external thread relative to the internal thread of the first rod coupling (44).

16. Actuator (10) for a process plant, comprising an actuating valve (14) and an actuating drive (12) which has an actuating drive housing (20) and a drive rod (18) mounted in the actuating drive housing (20), wherein the actuating drive housing (20) is connected to a valve housing (22) of the actuating valve (14) via a connecting housing (16), wherein the actuating valve (14) comprising a valve seat (24) and a valve member (36) which interacts with the valve seat (24) and is connected to a valve rod (38) which protrudes into the connecting housing (16), wherein a first rod coupling (44) is provided in order to transfer the driving force between the drive rod (18) and the valve rod (38), and wherein a modular unit composed of the drive rod (18), the valve rod (38) and the first rod coupling (44) is mounted movably relative to the connecting housing (16) via a rotation lock (44d, 50, 52), characterized in that a second rod coupling (46) and an adjusting rod (42) are provided, the adjusting rod (42) being provided in the region between the drive rod (18) and the valve rod (38), one rod coupling (44, 46) coupling the adjusting rod (42) to the drive rod (18) and one rod coupling (44, 46) coupling the adjusting rod (42) to the valve rod (38); and the valve rod (38) has an external thread at a free end of the valve rod (38) that is associated with the first rod coupling (44), the first rod coupling (44) having an internal thread associated with the external thread of the valve rod (38), so that a fine adjustment of the distance of the valve rod (38) with respect to the adjusting rod (42) can be made in the first rod coupling (44).

17. Actuator (10) for a process plant, comprising an actuating valve (14) and an actuating drive (12) which has an actuating drive housing (20) and a drive rod (18) mounted in the actuating drive housing (20), wherein the actuating drive housing (20) is connected to a valve housing (22) of the actuating valve (14) via a connecting housing (16), wherein the actuating valve (14) comprising a valve seat (24) and a valve member (36) which interacts with the valve seat (24) and is connected to a valve rod (38) which protrudes into the connecting housing (16), wherein a first rod coupling (44) is provided in order to transfer the driving force between the drive rod (18) and the valve rod (38), and wherein a modular unit composed of the drive rod (18), the valve rod (38) and the first rod coupling (44) is mounted movably relative to the connecting housing (16) via a rotation lock (44d, 50, 52), characterized in that a second rod coupling (46) and an adjusting rod (42) are provided, the adjusting rod (42) being provided in the region between the drive rod (18) and the valve rod (38), one rod coupling (44, 46) coupling the adjusting rod (42) to the drive rod (18) and one rod coupling (44, 46) coupling the adjusting rod (42) to the valve rod (38); and the rotation lock has releasably arranged sliding shoes, which are designed as sliding bolts (52), via which the rotation lock rests against the connecting housing (16) and is supported thereon and which enables it to slide along the connecting housing (16) in contact therewith during a stroke movement of the drive rod (18).

18. Actuator according to claim 17, characterized in that the sliding shoes (52) are made of plastic.

* * * * *